United States Patent [19]

Suh et al.

[11] Patent Number: 4,548,773
[45] Date of Patent: Oct. 22, 1985

[54] INJECTION MOLDING METHOD

[75] Inventors: Nam P. Suh, Sudbury; James R. Rinderle, Watertown, both of Mass.

[73] Assignee: Massachusetts Institute of Technology, Cambridge, Mass.

[21] Appl. No.: 386,618

[22] Filed: Jun. 9, 1982

Related U.S. Application Data

[62] Division of Ser. No. 152,493, May 22, 1980, Pat. No. 4,338,068.

[51] Int. Cl.[4] .............................................. B29F 1/00
[52] U.S. Cl. .................................... 264/40.6; 264/327; 264/328.16
[58] Field of Search ...................... 264/40.6, 319, 327, 264/328.14, 328.16; 425/144, 548, 552

[56] References Cited

U.S. PATENT DOCUMENTS

| | | | |
|---|---|---|---|
| 2,979,773 | 4/1961 | Eolstad | 18/34 |
| 2,984,887 | 5/1961 | Thiess | 25/129 |
| 3,733,161 | 5/1973 | Nussbaum | 425/144 |
| 3,763,293 | 10/1973 | Nussbaum | 425/144 |
| 3,827,667 | 8/1974 | Lemelson | 249/80 |
| 4,072,181 | 2/1978 | Kostura et al. | 425/144 |
| 4,172,872 | 10/1979 | Nagai | 264/327 |
| 4,390,485 | 6/1983 | Yang | 264/25 |

Primary Examiner—Jeffery Thurlow
Assistant Examiner—V. Fischbach
Attorney, Agent, or Firm—Arthur A. Smith, Jr.; Robert F. O'Connell

[57] ABSTRACT

A novel method and device for precision injection molding is disclosed providing controlled cooling of a portion of the mold cavity surface during the molding cycle, or several such portions independently, and also, in the preferred embodiment controlled heating of a portion of the mold cavity surface during the molding cycle or several such portions independently, whereby high quality, high precision parts having close dimensional tolerances may be produced. Another aspect of the invention, a volume-controlled variable conductance heat pipe is disclosed, which novel heat pipe comprises housing means forming a sealed chamber, fluid, such as water or ammonia, within the chamber, wicking means and control means for controlling the thermal conductance of the heat pipe comprising means for controlling the volume of fluid in the liquid phase in the chamber. Preferably, the novel injection mold comprises a thin mold face supported at least in part by a foundation means which either incorporates, or is itself, a novel volume controlled variable conductance heat pipe as disclosed.

2 Claims, 4 Drawing Figures

INJECTION MOLDING METHOD

This is a Division of application Ser. No. 152,493, filed May 22, 1980, now U.S. Pat. No. 4,338,068, issued on July 6, 1982.

This invention relates to an injection molding device and method, and to a novel variable conductance heat pipe which may be used in such device and method. More specifically, it relates to an injection molding device and method which provide controlled differential mold cooling and heating capability.

Injection molding is a process by which some malleable material is forced under pressure into a closed mold. The material solidifies and retains the shape of the mold. Thermalplastic materials, thermosetting materials and ceramic materials can be processed in this way. In a typical injection molding process, a material is melted and injected into a mold that is clamped closed. The material freezes in the relatively colder mold and is then ejected.

At the beginning of the molding cycle, material is melted and then injected into the mold through the sprue bushing, runner, and gate. During injection, the melted material (the melt) is subject to a cooling effect by contact with the relatively lower temperature surface of the mold but is subject to a heating effect due to viscous dissipation in the melt. If the cooling effect is much greater than the heating effect, the plastic will solidify before the mold is filled, resulting in a short shot. If the heating effect dominates, the molding cycle can be unnecessarily extended. The melt temperature and injection rate must be chosen so that neither of these problems occurs.

At the end of the injection period the flow in the mold stops, the pressure rises rapidly and the material begins to cool. As the material cools it shrinks slightly and more material is forced into the cavity due to the hold pressure acting on the melt. This portion of the molding cycle is called the hold or the packing stage and continues until the hold pressure is released or until the gate freezes. After the gate has frozen, the material continues to cool, which at first causes a reduction in pressure and then shrinkage of the material in the cavity. When the part has cooled sufficiently to remain rigid, the mold is opened and pins eject the part, runner, and sprue from the mold.

Conventional injection molding techniques have been found inadequate for production of molded parts in certain instances. Typically, for example, high precision parts having close dimensional tolerances often cannot be produced employing conventional injection molding techniques. Molded parts, especially those having non-uniform wall thickness, are often found to undergo warping, cracking and other distortions believed to be due in part to molded-in stresses within the molded part. Such deficiencies in current injection molding techniques preclude their use for production of many precision parts and increase the cost of close tolerance molded items. Reduction or elimination of these problems would lead to broader application of injection molding methods and reduce costs, for example, by eliminating secondary operations such as sanding, painting, and drilling that are often necessary to obtain precision parts. Moreover, waste could be reduced by a sufficiently precise injection molding method.

Shrinkage of the melt material after the gate has frozen is a significant problem. Shrinkage occurs with various molding materials and is usually compensated for by designing the mold over-size. That is, the approach generally taken to reduce deviations from the desired shape of the molded part is to compensate for shrinkage and other distortions by altering the mold cavity design. Shrinkage can vary, however, for example, from about 0.7% for PMMA molded at 20,000 psi to about 7% for polyethylene molded at 5,000 psi. Also, the shrinkage amount often depends on several molding conditions, such as injection rate, temperature, and configuration of the molded part, which cannot be calculated exactly. The shrinkage of nylon, for example, depends on the degree of crystallinity, which in turn depends on injection flow patterns and cooling rate. Distortions due to shrinkage may show up, for example, as sink marks (surface depressions), bending, and parts out of round. Thus, for example, employing current injection molding techniques, it is often difficult to hold a roundness dimension closer than about 0.7%, or a concentricity dimension closer than about 0.5%. Thus, while it is simple in theory to compensate for shrinkage by designing the mold over-size, generally the mold designer cannot accurately predict the final shape of the part and therefore cannot completely compensate for these problems. These variations in shrinkage and the consequent, often unpredictable distortions in the shape of the molded part have caused current injection molding techniques to be found unacceptable when close dimensional tolerances are specified for the molded part.

Another shape distortion problem presented by current injection molding techniques is warping, which along with shrinkage, contributes to the overall problem of precision shape reproduction. Warping is common along flat thin surfaces of parts and distortion fo regular geometric shapes or spacial relationships often occurs in molding. In thick sections or ribbed sections, a sink mark is a common distortion problem. If aesthetic considerations are important, even very small sink marks can be a serious problem.

Obtaining satisfactory mechanical, optical, and environmental properties for the molded part can also present significant problems. Molded parts often exhibit anisotropic mechanical properties, poor impact strength and poor resistance to solvent cracking. Moreover, the as-molded condition of parts often is not stable. Properties and dimensions of parts can change after molding.

The approach generally employed to reduce the abovedescribed injection molding problems is to evaluate a number of trial molding cycles to identify an acceptable cycle. The evaluation by trial process is used to design molds, set up molding operations, and to produce parts. This often difficult approach has significant drawbacks which include expense and production delays. Delays occur due to the iterative nature of the approach and the time required to make the necessary adjustments at each step. Large expense may result from non-productive men and machine during each redesign period and from the production of scrap parts and wasted materials. Also, the cost of mold modification can be high. Identifying the proper injection molding cycle by trial and error is also difficult due to the interdependence of the numerous process variables, such as melt temperature, injection pressure, part configuration, among others. Thus, it is often difficult or impossible to predict the effect of a change on the final characteristics of the molded part.

It is a primary objective of the present invention to provide an injection molding method and device to produce injection molded parts having close dimensional tolerances, which reduces the need for evaluation of trial molding cycles to identify an acceptable cycle.

It is also a primary objective of the present invention to provide an injection molding method and device wherein the shrinkage and dimensional distortions need not be compensated for by alteration of the mold cavity design.

It is an object of the present invention to provide an injection molding method and device suitable to produce high precision molded parts having close dimensional tolerances, and molded parts having non-uniform wall thickness throughout the part, which undergo little or no warping or cracking or other distortion.

It is an object of the present invention to provide an injection molding method and device for production of molded parts having isotropic mechanical properties, good impact strength and good resistance to solvent cracking. It is likewise an object to provide such device and method suitable for the production of molded parts whose as-molded condition is substantially stable over time.

It is an object of the present invention to provide an injection molding method and device wherein little or no shrinkage of the melt material occurs after the gate has frozen, and to provide such a method and device wherein there is no need to alter the design of the mold cavity design to compensate for shrinkage. It is an object to prevent distortions in injection molded parts, otherwise resulting due to shrinkage, such as sink marks, bending and parts out of round.

It is another object of the present invention to provide an injection molding method and device suitable for production of molded parts which undergo little or no warping, even along flat, thin surfaces of the parts.

According to the present invention, an injection molding device for production of high quality, close dimensional tolerance, injection molded parts comprises an injection mold having at least one and most often two or more mold pieces defining a mold cavity, cooling means for cooling at least a portion of the mold cavity surface and cooling control means for controlling heat flow from at least a portion of the mold cavity surface. The cooling of at least one portion of the mold cavity surface is controlled independently of the cooling of other portion(s) of the mold cavity surface. The cooling control means preferably has a sufficiently fast response time, such that the molding cycle is not significantly extended. The cooling control means preferably comprises variable conductance heat pipes and most preferably volume controlled variable conductance heat pipes having means for controlling the liquid volume and/or total fluid content within the heat pipe(s). The injection molding device also preferably comprises heating means for heating at least a portion of the mold cavity surface. Preferably, at least one mold piece comprises a thin mold face forming the cavity-side surface thereof and heating means are incorporated into the thin mold face. In this preferred embodiment, a portion or all of such thin mold face is directly supported in part by the main mold frame and in part by suitable foundation means. The foundation means comprises a support structure of sufficient compressive stiffness to provide dimensional stability to the supported thin mold face during the molding cycle. The support structure preferably has suitably low thermal inertia such that the molding cycle is not significantly extended by long cooling time requirements, and preferably the aforesaid cooling means, such as heat pipes, are incorporated into the support structure. The cooling control means may be located at a suitably accessible remote location. The main mold frame may be constructed, for example, of solid steel to provide sufficient rigidity. Conventional mold cooling channels in the main mold frame and other conventional injection mold features may be provided in the known fashion. The main frame may be mounted to the platens of an injection molding machine in the known fashion.

The operation and advantages of the present invention will be more apparent from the following drawings and description of illustrative and preferred embodiments of the present invention.

IN THE DRAWINGS

Figure 1:
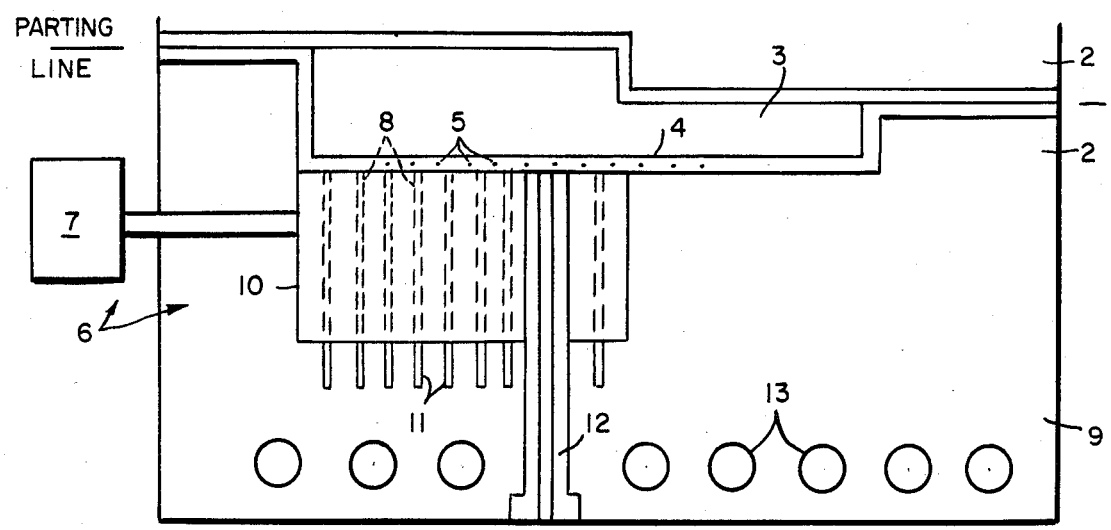
FIG. 1 is a schematic cut-away drawing of an exemplary injection molding device according to a preferred embodiment of the present invention.

While not intending to be bound by theory, it is helpful to an understanding of the present invention to consider a molded part as comprised of minutely small contiguous elements of molding material. During the conventional molding cycle, post-injection flow of material often occurs between different portions of the molded part, i.e., from one such element to another, which can result in anisotropic molecular orientation, sheering and ultimately distortion of the molded part. This may be referred to as "secondary flow". That is, after injection of the molding material into the mold, the temperature drops and the tendency is for shrinkage to occur in response to the change in temperature. Where the density, and therefore the volume of material within a given minute element of the molded part is dependent on the temperature of that material, it can be seen that the average temperature of each such minute element must remain approximately equal to the average temperature of each other element during the molding cycle if there is to be no substantial flow into or out of any one of such minute elements. At the same time, the pressure in the mold drops and the tendency of the molding material is to expand due to the lower pressure. Therefore, unless the material throughout the molded part is sufficiently temperature homogenous and isotropic during the cooling and solidification of the part, anisotropic molecular orientation within the molded part can result due to sheering or extending the melt just prior to solidification within the mold. By insuring a sufficiently homogenous temperature and isotropic condition, at least on average over a region of the part, to eliminate secondary flows between regions within the molded part, the conditions of substantially homogenous and isotropic density, stress and molecular orientation can be achieved.

According to the present invention, by controlling the cooling rate of at least one portion of the molded part independently of other(s) during the molding cycle, the average temperature of each region within the part is kept sufficiently close to the temperature of at least those regions proximate to it. This is accomplished by controlling the heat flow from the surface of the mold cavity. Approximate temperatures at points within a cooling molded part can be computed numerically using the heat conduction equation or by using graphical solutions or other methods well known to those skilled in the art. Especially with the aid of suitable computing machinery, it will then be well within the skill of the art to identify those portions of a molded part from which greater or lesser heat flow will be required to maintain a sufficiently consistent temperature throughout the molded part as it cools.

Cooling of the mold cavity surface according to the method and device of the present invention varies not only from one portion thereof to another. Rather, it also varies with time since the desired rate of heat transfer from the melt, or any portion thereof, will generally not remain constant throughout the molding cycle. It may be necessary or desirable at times during the cooling of the melt to change the rate of heat absorption from one or more of the independently cooled portions of the molded part to maintain the sufficiently consistent temperature throughout the molded part during the cooling portion of the molding cycle. Thus, according to the present invention, the cooling means provided to each portion of the mold cavity surface will have variable conductance responsive to cooling control means enabling regulation of the rate of heat transfer provided by that cooling means.

Moreover, especially for purposes of economy of time, and consequently of cost, it is highly desirable that the control means be capable of changing the rate of heat transfer rapidly. Since the rate at which injection molded parts can be produced is determined in large part by the time it takes to cool the melt, and in view of the heating of the cavity surface provided according to one aspect of the present invention, the cooling means will most preferably be capable of substantially instantaneous change from near zero heat absorbtion (e.g., during heating of the mold cavity surface) to the full desired rate or heat absorbtion (e.g., subsequent to injection). Thus, the cooling means must have a sufficiently rapid response to the cooling control means.

In addition to controlling the cooling rate of different portions of a molded part to avoid molding defects which arise during the cooling portion of the molding cycle, it is necessary to minimize or eliminate molding defects such as anisotropic molecular orientation that result during the injection of the molding material into the mold. Due to the molecular structure and high viscosity of common injection molding materials, it is often not practical to completely avoid orientation during injection. According to the present invention it is possible, however, by heating the molded cavity surface, to allow molecular orientation within the melt to relax before it freezes and orientation locked-in. Thus, heating means are provided for heating the mold cavity surface or some portion(s) thereof during a suitable portion of the molding cycle. The heating of different portions of the mold cavity surface may be independently controlled.

Prior efforts to employ heated mold cavity surfaces to produce molded parts have been inadequate or impractical for at least two reasons. The first is that the heating step fails to avoid distortions in the molded part resulting from secondary flow-induced molecular orientation and shearing. The second is the increased molding cycle time. The time necessary to allow relaxation of the melt, while dependent in part on the molecular structure of the injection material, varies greatly with temperature. Since a commercially practical injection molding cycle must involve a short molding cycle time, heating the mold for sufficient time to provide adequate molecular relaxation and the consequent increase in the requisite cooling time significantly increased the overall molding cycle time. According to the present invention however, means for rapidly absorbing and rejecting heat from the molded part are provided, which cooling means is variable over time and thus does not prevent or substantially interfere with heating the cavity surface. Rather, the cooling means is employed only during that portion of the molding cycle when the temperature of the mold cavity surface is to be reduced. Thus, the molding device of the present invention enables heating of the mold cavity without substantially increasing the molding cycle time. By providing variable and independent cooling means for different portions of the molded part, and by providing heating means for the mold cavity surface, a synergistic effect is achieved in that high quality injection molded parts of close dimensional tolerance, free of substantially either injection-induced or secondary flow-induced distrotion can be produced within a short molding cycle time.

With conventional injection molding techniques, shrinkage of the molded part away from the walls of the cavity often occurs. This may be acceptable since the mold cavity could be made oversize by an approximate compensating amount. This shrinkage may result in slight distortion of the molded part, however and thus is preferably to be avoided in the production of high quality molded parts according to the present invention. Relatively higher mold cavity pressures are used in the preferred embodiment of the present invention to produce molded parts that are substantially the same volume as the cavity. Accordingly, the cavity can be designed substantially exactly to size rather than oversize by some approximate amount and thus molded parts can be held to close dimensional tolerances.

The cavity pressure necessary to produce moldings that are the same volume as the cavity are typically quite high, but will vary from one molding material to another and will vary with the demolding temperature and pressure, $T_f$ and $P_f$ respectively. For illustrative purposes, conditions necessary to obtain substantially zero volume change of PMMA moldings are shown in the following Example.

EXAMPLE I

Figure 4:
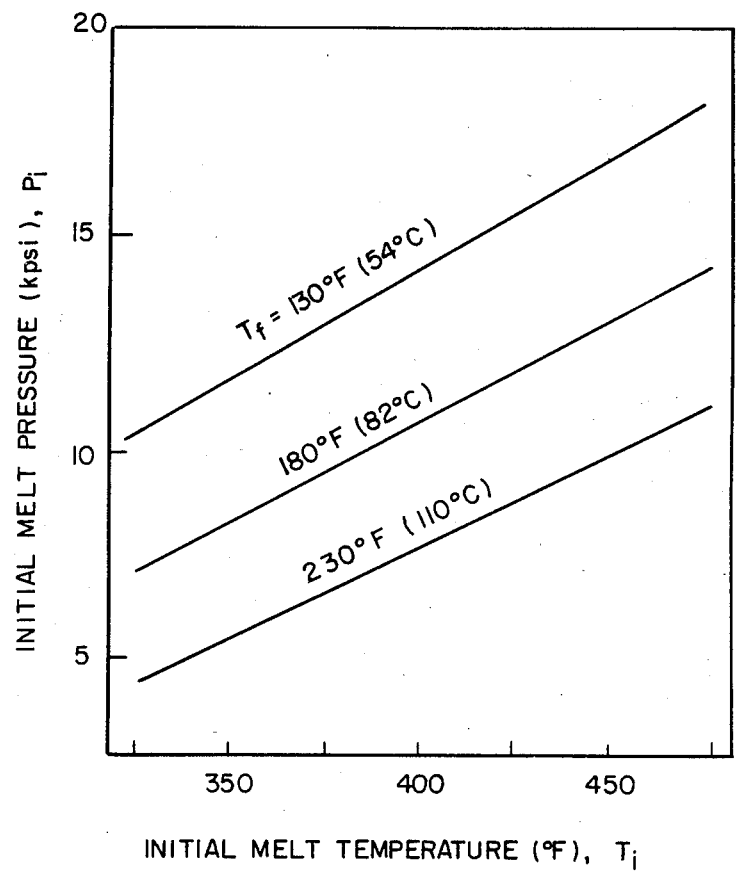
FIG. 4 is a graph showing the relationship between the initial melt temperature and initial melt pressure required to obtain substantially zero volume change during molding.

Referring now to FIG. 4, is the injection temperature. The initial melt pressure $P_i$ defines the condition within the cavity, not the injection pressure. $T_f$, the demolding temperature is the average temperature throughout the part and is usually significantly higher than the surface temperature. Demolding is at atmospheric pressure. In view of the present disclosure, it is within the skill of the art to select suitable pressures for use in conjunction with the present invention. Thus, for example, mold cavity pressures of from about 5,000 to as high as 20,000 psi or more may be required. The injection molding device must be capable of withstanding the high pressure without damage. Since the clamp force required in an injection molding press is the product of the cavity pressure and the area of the cavity projected onto the plane of clamping, the high cavity pressures will increase the clamping requirement of the machine. The high mold cavity pressures is also a consideration in the design of the support provided to the mold surface. At the very least a mold must be supported to the extent that there will be no permanent deformation of the mold during the molding cycle. Where, for example, precision parts must often be produced within tolerances tighter than 0.001" but such parts can be manufactured in a mold which deflects more than 0.001" during the cycle if at the final stage of molding the pressure returns to atmospheric and the elastic deflections return to zero. The requirements on deflection then will often be much less severe than the tolerance on a molded part.

A preferred embodiment of an injection molding device according to the present invention is shown in FIG. 1. An injection molding device for use in accordance with the present invention, as shown in FIG. 1, provides differential mold cooling, heating of the mold cavity surface and high cavity pressures for the production of injection molded parts of high quality having little or no shape distortions.

Injection mold device (1) comprises mold pieces (2) and (2') defining mold cavity (3) which, for exemplary purposes, is shown to have non-uniform thickness throughout the part. If used in conjunction with conventional injection molding techniques, such configuration would present problems of shape distortion and molded parts of low quality as discussed above.

Mold piece (2) is exemplary of the most preferred mold piece design according to the present invention. Mold piece (2) comprises a thin mold face (4) forming at least a portion of the cavity-side surface thereof. As well known in the art, the mold face must be able to maintain the desired cavity shape, must maintain a high quality surface finish, must resist wear and must be able to endure the work environment. Moreover the thin mold face must be capable of enduring the thermal cycling of the injection molding process according to the present invention and must therefore comprise a material with sufficiently high thermal diffusivity. There are numerous manufacturing techniques well known to those skilled in the art suitable for making the thin mold face according to the preferred embodiment of the present invention. Thus, for example, the conventional method of machining a mold cavity may be used. The cost however of manufacturing a thin mold face in the case of an irregular cavity geometry may be high since machining of both sides is required to produce a uniform surface thickness which is generally preferred. Alternatively, a layer of metal may be built up over a mandrel according to methods known to the art. One such method, for example, is to spray atomized liquid metal onto a mandrel. This may be done by melting the metal, for example with an arc or with an oxygen-acetylene flame, and propelling the metal onto the form with an airjet by methods well known in the art.

Preferably, however, electroforming is used to deposit metal onto a form. Using methods well known to the art, a layer of plating is built up to a desired thickness. The plating is then separated from the form and is used as a mold to produce the original form. The mechanical properties of the deposited metals have been found to be good and high resolution is obtained. While irregular geometries may result in variations in plating thickness, this problem can generally be alleviated according to methods well known in the plating art, such as for example by using "thiefs" and "shields" to modify current density.

The low thermal inertia or thin mold face, according to the preferred embodiment, enables it to be heated or cooled rapidly, and thus enables rapid and accurate control of the heating and cooling rate during the molding cycle.

According to the present invention, heating means are provided for heating at least a portion of the mold cavity surface prior to and or during injection of the melt. Heating of the thin mold face can be accomplished in a number of ways. For examples, direct convection heating could be used by introducing a heated fluid into the cooling channels (13) of the mold to alternate with the cooling fluid which would normally flow therein. However, since cooling channels can not normally be located sufficiently proximate to the surface of a mold, a sufficient change in cavity surface temperature may require substantial time depending upon the geometry of the mold and the cooling channels. Transporting heat to the thin mold face with a device such as a heat pipe or heating the surface by radiation or conduction provide alternative heating methods. According to the preferred embodiment of the present invention however as shown in FIG. 1, heat is generated directly in the thin mold face by incorporation therein of electrical resistance heaters. Any suitable method of incorporating electrical resistance heaters into the thin mold face may be used. According to a suitable method, the thin mold face is formed around the electrical resistance heaters by an electro-forming process. The electro-forming process is interrupted after a thin layer has first been deposited, an electrical resistance element is laid upon the surface and the electro-forming process is continued to the desired thickness. In this manner, the electrical resistance heaters are encapsulated in the deposited metal, preferably nickel. Such a process yields a thin mold face that has an electrical resistance heater in the desired location, and very near the surface of the molding. Preferably, a Kanthal resistance wire, insulated with a thin teflon coating may be incapsulated in an electro-deposited nickel thin mold face. However, other commercially available heaters may be used.

In accordance with the present invention, different portions of the mold cavity surface may be cooled at different, independently controlled rates. The exemplary preferred embodiment, shown in FIG. 1, variable conductance cooling means (6) is provided for at least a portion of the mold cavity surface (4). The cooling means (6) comprises cooling control means (7), shown schematically, for controlling the rate at which that portion of the mold cavity surface is cooled by heat conductance means (8). As noted above, use of mold surface heating means in conjunction with mold surface cooling means is more effective where the rate of cooling is controllable over time as well as position. Therefore, preferably the heat conductance means has a sufficiently fast response to the cooling control means such that the molding cycle is not substantially extended. Preferably, the heat conductance means comprises variable conductance heat pipes. That is, according to the preferred embodiment of the present invention, as shown schematically in FIG. 1, one or more portions of the thin mold face is each cooled by an independently controlled heat conductance means comprising one or more variable conductance heat pipes.

The heat pipe is a well known device used for transporting heat. The rate of heat flow can be controlled by methods well known to the art, thereby providing variable heat conductance away from the mold cavity surface. A heat pipe comprises a (generally pure) fluid, for example water or ammonia, and a porous wick structure, comprising for example, fine mesh screen, in a sealed chamber. The fluid is in a two-phase, liquid-vapor state during normal operation of the heat pipe. Heat is transferred into the pipe by conduction through the wall at the hot end of the pipe. This region is called the evaporator. The heat causes some of the liquid in the wick to evaporate which results in a slight increase in pressure at the evaporator. This pressure gradient drives the vapor to the cold end of the heat pipe condenser. Heat is rejected as the vapor condenses. The rejected heat is conducted through the pipe wall to the outside of the heat pipe. The condensed liquid collects on the wick at the condenser and is pumped to the evaporator by capillary action within the wick. The return of the fluid to the evaporator completes the cycle for the fluid. The operation and application of the heat pipes is given by Chi, S.W., *Heat Pipe Theory and Practice*, McGraw Hill Book Co., 1976 incorporated herein by reference.

The control action of heat pipes, such as for example, the gas-loaded and excess-liquid type, occurs at the condenser end of the pipe. These devices are controlled by a change of the conditions at the cold end of the pipe. If the desired control action is to stop heat transfer at the hot end, the system operates by stopping heat transfer at the cold end. Heat continues to be transferred into the pipe at the evaporator until the heat pipe temperature rises to the temperature of the heating surface. The delay between control signal and control action makes the use of this type of device less preferred for mold temperature control according to the present invention.

Vapor-flow-modulated heat pipes respond more rapidly than gas-loaded pipes, but performance depends on reliable operation of throttling valves near the mold surface.

An alternative to these types of devices is a volume-controlled variable-conductance heat pipe. The control action in this type of device occurs at the hot end of the heat pipe.

Figure 2:
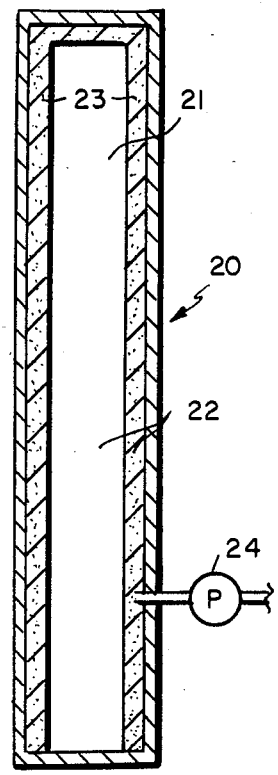
FIG. 2 is a schematic drawing of a volume controlled variable conductance heat pipe according to a preferred embodiment wherein the conductance is varied by fluid content control means.

Since cooling means (6) preferably responds quickly to cooling control means (7), to adequately control heat flux at the hot end of the heat pipe, i.e. at the mold cavity surface, most preferably a volume controlled variable-conductance heat pipe according to the following description is employed. The novel volume controlled variable conductance heat pipes of the present invention function by inhibiting the flow of liquid to the evaporator by decreasing the volume of fluid in the liquid phase in the heat pipe. This results in decreased capillary pumping in the wick or "wick dry out". When this occurs, significant amounts of heat can no longer be effectively absorbed by the evaporator. The change in heat conductance may be obtained by the direct removal or addition of fluid to the sealed enclosure. FIG. 2 shows schematically such a volume controlled variable conductance heat pipe. Housing means (20) forms a sealed chamber (21). A fluid (22) which in normal operation would comprise both a liquid and a vapor phase, is contained within the sealed chamber. The liquid phase of the fluid would normally reside within wicking means (23) and be carried by wicking means to the heat absorbing end of the heat pipe, the evaporator. Fluid control means (24) provides control of the amount of fluid (22) in said sealed chamber (21) by the addition of or withdrawal of a portion of fluid (22) to control the rate of heat absorption at the evaporator. The fluid control means (24) may comprise a fluid reservoir and a reversible metering device forming a connection between the fluid reservoir and the sealed enclosure.

The reversible metering device may, for example, comprise a reversible metering pump. Alternately, the liquid volume control means may comprise at least one uni-directional valve. Preferably, 2 uni-directional valves would be used to connect the sealed enclosure to the fluid reservoir. Preferably, the uni-direction valves are metered valves. The valves may be solanoid controlled or, alternatively pneumatically controlled.

Figure 3:
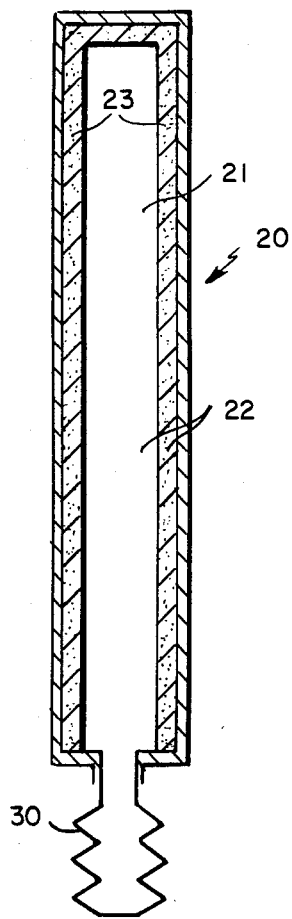
FIG. 3 is a schematic drawing of a variable conductance heat pipe according to a preferred embodiment wherein the conductance is varied by volume control means comprising a bellow means.

An alternative volume controlled variable conductance heat pipe according to the present invention is shown schematically in FIG. 3. Therein, variable volume bellow means (30) are provided to controllably change the total volume of the sealed enclosure (21) of the heat pipe. The cavity of bellow means (30) is of controllably variable volume and comprises a portion of the sealed chamber (21). By causing a rapid, preferably almost instantaneous increase in the volume of the sealed enclosure, some portion of the fluid (22) responds to such increase in volume by evaporating into the vapor phase. The resultant liquid depletion in the wick, causes an almost instantaneous decrease in the available capillary pumping capability of the heat pipe. Heat transfer at the evaporator effectively stops when the capillary pumping of the wicking means (23) ceases to supply liquid to the evaporator. Accordingly, an increase in volume decreases the conductance of the heat pipe nearly instantaneously. It should be understood that any means or method of controlling the total volume of the sealed chamber is intended to be included within the term bellow means.

Since the control action in the volume controlled variable conductance heat pipe occurs at the evaporator end of the heat pipe, it has a rapid response to the cooling control means. That is, sufficiently rapid and accurate control of the rate of cooling from the affected portion of the mold cavity surface is provided by the volume-controlled variable conductance heat pipes of the present invention. It should be noted that the operation of a heat pipe will depend on its orientation in a gravity field.

The performance of the volume controlled variable conductance heat pipe depends on the degree to which capillary pumping action is affected by liquid volume changes made by the control means, that is, on the loss of capillary pumping action due to liquid depletion. In the volume controlled variable conductance heat pipe of the type shown in FIG. 2, having means for controlling the total amount by weight of the fluid within the sealed chamber, the degree of liquid depletion is controlled directly. In the volume controlled variable conductance heat pipe of the type shown in FIG. 3, having a variable volume bellow means, the degree of liquid depletion may depend on either the rapidness of the volume change or the amount of the change or both. In both types of volume controlled variable conductance heat pipes, conduction is controlled by causing a liquid depletion at the hot end of the heat pipe, i.e. at the evaporation. Because heat conductance is controlled at the evaporator rather than at the condenser, the heat absorption by the evaporation of the volume controlled variable conductance heat pipe of the present invention responds rapidly to the control means.

In this regard, it is important to note, however, that the dynamic performance of the volume-controlled heat pipe is quite different from the equilibrium, isothermal performance. Consider first an isothermal expansion of the volume of the sealed chamber. The volume of liquid driven into the vapor phase during an isothermal expansion depends on the fluid and on the operating conditions. For example, at 300° F., a 370 cm$^3$ volume change is required to drive 1 cm$^3$ of water to the vapor phase. Only 9% of that volume change is necessary if the water is at 500° F. and only 2.8% is needed if the water is at 600° F. Note, however, that the benefits of operating volume controlled heat pipes near the critical point, are offset in some applications by the reduced heat transport capability at elevated temperatures. For example, a water heat pipe at 500° F. has only 70% of the capability of a heat pipe at 300° F.

If the heat pipe volume is changed very rapidly, the conditions inside the pipe are more nearly adiabatic than isothermal. In such a case, the liquid volume decreases only slightly at first and the pressure and temperature drop. Heat conducted into the device causes more of the liquid to be vaporized until the device reaches the steady state. That is, during the change, the heat transfer rate at the hot end increases briefly and then decreases. Consider for example a heat pipe that is maintained at 500° F. The heat pipe volume is suddenly increased. The liquid volume decreases by 2.5% and the temperature drops to 489° F. Heat continues to be transferred into the pipe for a brief time until the temperature rises to 500° F. At this new condition the liquid volume is 90% of the original liquid volume and the overall conductance of the device has been reduced approximately 75%.

While the temporary increase in heat transfer was contrary to the ultimate result, the changes occur rapidly at the hot end of the pipe so that it remains possible to use the volume controlled variable conductance heat pipe to accurately profile the heat transfer rate at the evaporator. In fact, this aspect of the novel heat pipes of the present invention can be advantageously relied upon to accurately profile heating and cooling during the molding cycle. By changing the volume at the appropriate time during the molding cycle, the temporarily increased cooling effect and subsequent rapid reversal can be made to coincide with those portions of the molding cycle during which cooling and then heating, (or at least decreased cooling), respectively, is needed. In this way, increased accuracy can be achieved in profiling the cooling and heating of the mold during the molding cycle. Similarly, the opposite effect, a brief decreased cooling and subsequent rapid reversal to increased cooling when the heat pipe volume is decreased can be advantageously employed to accurately control the cooling of the mold during the molding cycle.

An important advantage of using volume-controlled variable conductance heat pipes for mold cooling, according to the present invention is that the heat transfer at the evaporator can be controlled directly. Evaporator control allows faster and more accurate control of the temperature and the heat transfer rate at the mold cavity surface. Thus, the dynamic response characteristics of these devices can be utilized to profile the cooling rate over time. However, the volume controlled variable conductance heat pipe of the present invention may be used not only in the presently disclosed injection molding invention, but also where a conventional heat pipe would otherwise be used or in any application where heat transfer is to be controlled. Moreover, it is useful in certain applications requiring more rapid or more precise control of heat conductance than is provided by a conventional heat pipe. It is envisioned for example, that certain embodiments of the present disclosed injection molding method and device would present such an application. Thus, the volume controlled variable conductance heat pipes of the present invention is a significant advance in the art independent of its application in the injection molding device and method.

Suitable wicking means include the materials known to the art, for example, one or more layers of 250 pores-/inch mesh wrapped phosphor bronze screen. Suitable housing means to form the sealed chamber may comprise any suitable material such as those well known to the art and any suitable form, adapted to the particular application. Cylindrical half inch O.D. cooper heat pipe is exemplary. The heat pipe materials and fluid should be selected to assure sufficient compatability. Thus, for example, a sufficiently compatible heat pipe may comprise housing means of copper pipe, wicking means of copper screen and water as the fluid. Alternately, stainless steel pipe, fine stainless steel screen and water of ammonia may be used.

Thermocouples or other suitable temperature monitoring means may be included in the heat pipe, for example, at the evaporator end to monitor performance of the heat pipe or other purposes.

Having shown and described the most preferred heat conductance means (8), the description of the preferred embodiment of an exemplary injector molding device according to the present invention can be continued.

FIG. 1 shows that portions of the thin mold face (4) may be supported by main mold frame (9), while other portions are supported by a foundation means (10). The foundation means comprises a support structure of sufficient compressive stiffness to provide dimensional stability to the supported thin mold face during the molding cycle. In addition to supporting the mold face, the support structure in the preferred embodiment provides access to the thin mold face for the cooling means. The support structure must either be thermally isolated from the thin mold face or preferably have a low thermal inertia such that it does not substantially increase the time required for heating and cooling the thin mold face. In the preferred embodiment, the mold is cooled with the novel volume controlled variable conductance heat pipes of the present invention. The heat pipes preferably are built into the foundation means to transfer heat from the thin mold face to the main mold frame (9) according to such preferred embodiment, for example, a foundation means may comprise a suitable low thermal inertia rigid epoxy material, suitable heat pipe(s), for example cylindrical heat pipe(s) according to the present invention, are positioned within and through the epoxy. The evaporator is placed at the thin mold face and the heat pipe(s) extended through the foundation means to the main mold frame. The cooling control means can make connection to the heat pipe(s) within the foundation means. The rapid response of the novel heat pipes and the low thermal inertia of the thin mold face together provide more rapid and accurate control of the heating and cooling rate during the molding cycle than could be achieved, for example, with a conventional solid steel molding piece.

Alternate to incorporating heat pipes into the support structure, the support structure can be used to function itself as the presently disclosed novel heat pipe. Thus, for example, the foundation means may comprise a sealed chamber and one or more parallel columns, for example solid stainless steel columns, extending from the thin mold face to the main mold frame. The columns may be wrappered with fine stainless steel screen and the sealed chamber is charged with a suitable fluid, for example water. Suitable cooling rate control means may comprise bellow means outside the main mold frame having a sealed connection to the foundation means. In such an embodiment of the injection molding device of the present invention, the foundation means itself comprises a novel heat pipe according to the present invention.

Control means for the heating means and the cooling control means may be suitably located at any convenient and accessible position. For example, the heat conductance means can comprise the novel volume controlled variable conductance heat pipes of the present invention and the volume control means may be located remote of the main mold frame.

Where volume controlled variable conductance heat pipes are incorporated into the support structure of the foundation means, that is, where the heat pipes extend from the frame, a most preferred embodiment as shown in FIG. 1 provides small channel(s) (11) in the main mold frame forming a portion of the heat pipe(s) and operates as at least a portion of the condenser thereof. In this manner heat transfer to the main mold frame and ultimately to the cooling channels is improved.

It should be recognized that where the main mold frame (9) does not directly support the thin mold face (4), it does so indirectly by supporting the foundation means (10) which in turn supports the thin mold face. The main mold frame may be provided with cooling channels (13) according to known methods. Injector pin bushing (12) and other conventional aspects of an injection molding device are provided in the manner well known to those skilled in the art.

As illustrated in FIG. 1, according to the present invention, neither all mold pieces of an injection mold device nor all portions of any single mold piece will necessarily have means for heating and/or variable rate cooling.

The controlled cooling of the present invention provides a significant advantage in that it is practical to heat the mold face in conjunction with such controlled cooling and yet achieve short molding cycle times. Heating the mold face provides significant advantage in that lower injection pressures may be used. Significant cost savings can be realized in the design and construction of mold devices for use with such lower injection pressures. Moreover, the use of lower injection pressure can provide molded parts having improved part quality, specifically, less cracking, distortion, molecular orientation and bi-refringence.

It should be understood that the disclosure is for the purpose of illustrations only and includes all modifications or improvements which fall within the scope of appended claims.

We claim:

1. A process for making injected molded parts during a molding cycle comprising the steps of injecting molding material into an injection mold cavity;

controllably heating at least a portion of the mold cavity surface of said mold during the injection of said molding material to maintain the temperature of said injected material at a sufficient level to prevent the molecules of said injected material from solidifying into a specific orientation;

cooling at least a portion of said mold cavity surface;

controlling the rate of cooling of at least one portion of the mold cavity surface of said mold independently from at least one other portion of the mold cavity surface of said mold so as to maintain the temperature of said injected material substantially the same throughout all portions of said mold cavity during the cooling portion of the molding cycle to prevent secondary flow of said injected material between portions of said mold cavity; and ejecting the part from the mold.

2. A process according to claim 1 wherein said step of controllably heating includes controllably heating at least one portion of said mold cavity surface independently from at least one other portion of said mold cavity surface.

* * * * *